(12) United States Patent
Watanabe et al.

(10) Patent No.: US 10,900,553 B2
(45) Date of Patent: Jan. 26, 2021

(54) PLANETARY POWER TRANSMISSION DEVICE

(71) Applicant: JTEKT CORPORATION, Osaka (JP)

(72) Inventors: Hajime Watanabe, Kashiwara (JP); Yuichi Matsumoto, Nishimuro-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/521,615

(22) Filed: Jul. 25, 2019

(65) Prior Publication Data
US 2020/0063836 A1 Feb. 27, 2020

(30) Foreign Application Priority Data
Aug. 24, 2018 (JP) ................. 2018-157357

(51) Int. Cl.
*F16H 57/08* (2006.01)
*F16H 57/021* (2012.01)
*F16H 13/06* (2006.01)
*F16H 57/02* (2012.01)

(52) U.S. Cl.
CPC .......... *F16H 57/021* (2013.01); *F16H 13/06* (2013.01); *F16H 57/082* (2013.01); *F16H 2057/02086* (2013.01); *F16H 2200/2005* (2013.01)

(58) Field of Classification Search
CPC ...... F16H 57/08; F16H 57/082; F16H 57/021; F16H 2057/02086; F16H 13/06
See application file for complete search history.

(56) References Cited

U.S. PATENT DOCUMENTS
2019/0360579 A1* 11/2019 Hannet .................. F16H 57/08

FOREIGN PATENT DOCUMENTS
JP 2014-015975 A 1/2014

* cited by examiner

*Primary Examiner* — Erin D Bishop
(74) *Attorney, Agent, or Firm* — Oliff PLC

(57) ABSTRACT

A planetary power transmission device includes a ring member; a sun member; a first shaft disposed concentrically with the sun member and fixed to the sun member; a plurality of planetary members provided between the ring member and the sun member; support shafts configured to respectively support the planetary members such that the planetary members are rotatable; a carrier member to which the support shafts are fixed, the carrier member being configured to rotate in accordance with revolution of the planetary members along an inner peripheral surface of the ring member; a second shaft fixed to the carrier member so as to be concentric with the first shaft; and a housing configured to accommodate the ring member, the sun member, the planetary members, and the carrier member. An outer peripheral surface of the carrier member is rotatably supported by the housing via a bearing.

2 Claims, 3 Drawing Sheets

PLANETARY POWER TRANSMISSION DEVICE

INCORPORATION BY REFERENCE

The disclosure of Japanese Patent Application No. 2018-157357 filed on Aug. 24, 2018 including the specification, drawings and abstract is incorporated herein by reference in its entirety.

BACKGROUND

1. Technical Field

The disclosure relates to a planetary power transmission device.

2. Description of Related Art

In the fields of machine tools, industrial machinery, and the like, a planetary roller power transmission device is used as a reducer capable of transmitting power with low noise and low vibration (for example, see Japanese Patent Application Publication No. 2014-15975 (JP 2014-15975 A)). As shown in FIG. 3, a planetary roller power transmission device includes a ring member 112, a first shaft (a sun member) 113, a plurality of planetary rollers 115, a carrier unit 116, and a second shaft 117.

The ring member 112 is fixed to an inner peripheral surface of a housing 111 of a planetary roller power transmission device 110, and the plurality of planetary rollers 115 is arranged on an inner peripheral surface 112b of this ring member 112. The first shaft 113, which contacts an outer peripheral surface of each of the planetary rollers 115, is disposed at the center of the plurality of planetary rollers 115, and the first shaft 113 is rotatably supported by the housing 111 via a rolling bearing 114. The carrier unit 116 includes a carrier plate 131 and support shafts 132, and each of the planetary rollers 115 is rotatably supported by the corresponding support shaft 132. The second shaft 117 is fixed to a center of the carrier plate 131, and this second shaft 117 is rotatably supported by the housing 111 via a rolling bearing 140.

In the configuration that has been described so far, each of the planetary rollers 115 contacts an outer periphery of the first shaft 113 and an inner periphery of the ring member 112 while applying a specified contact pressure thereto, and traction oil is applied to each of the contact surfaces. Then, rotary power of the first shaft 113 is transmitted to the planetary rollers 115 due to a shearing force of the traction oil, and the planetary rollers 115 roll on the inner peripheral surface 112b of the ring member 112. In this way, the rotary power is transmitted to the second shaft 117 via the carrier unit 116.

SUMMARY

Because this kind of planetary roller power transmission device is provided in various machines such as the machine tool, downsizing of the planetary roller power transmission device (i.e., reducing the size of the planetary roller power transmission device) is desired. In particular, a reduction of a distance between a device that inputs the rotary power to the planetary roller power transmission device and a device that receives an output from the planetary roller power transmission device significantly contributes to downsizing of the entire machine. Thus, it is desired to reduce a width of the planetary roller power transmission device in an axial direction.

Meanwhile, as shown in FIG. 3, each of the planetary rollers 115 is configured to slidingly contact the corresponding support shaft 132, and a slight clearance exists between each of the planetary rollers 115 and the corresponding support shaft 132. Accordingly, there is a possibility that the carrier unit 116 is tilted with the rolling bearing 140 on the second shaft 117 serving as a fulcrum. The tilting of the carrier unit 116 worsens (decreases) coaxiality of the first shaft 113 and the second shaft 117, which leads to degraded rotation accuracy and degraded power transmission performance. Thus, it is desired to restrain the tilting of the carrier unit 116 as much as possible.

The disclosure provides a planetary power transmission device that can be downsized, and makes it possible to restrain degradation of rotation accuracy and degradation of rotation transmission performance.

A planetary power transmission device according to an aspect of the disclosure includes a ring member; a sun member disposed concentrically with an axis of the ring member at a position radially inward of the ring member; a first shaft disposed concentrically with the sun member and fixed to the sun member; a plurality of planetary members provided between the ring member and the sun member; support shafts configured to respectively support the planetary members such that the planetary members are rotatable; a carrier member to which the support shafts are fixed, the carrier member being configured to rotate in accordance with revolution of the planetary members along an inner peripheral surface of the ring member; a second shaft fixed to the carrier member so as to be concentric with the first shaft; and a housing configured to accommodate the ring member, the sun member, the planetary members, and the carrier member. An outer peripheral surface of the carrier member is rotatably supported by the housing via a bearing.

In the case of the planetary power transmission device in the related art shown in FIG. 3, the carrier member (the carrier plate) 131 is supported by the housing 111 via the bearing 140 that supports the second shaft 117. Therefore, in order to secure a mounting space for this bearing 140, the width of the housing 111 needs to be increased in an axial direction. In contrast, in the aspect of the disclosure, since the outer peripheral surface of the carrier member is supported by the housing via the bearing, a bearing that supports the second shaft is unnecessary. Thus, a width of the housing can be reduced, and accordingly the housing can be made compact. In addition, since the carrier member is directly supported by the housing, tilting of the carrier member is restrained, and coaxiality of the first shaft and the second shaft can be maintained. Therefore, it is possible to restrain degradation of rotation accuracy and degradation of power transmission performance.

The bearing may serve as a restricting member that restricts movement of the planetary members to a first axial side. In the case of the planetary power transmission device in the related art shown in FIG. 3, the movement of the planetary rollers 115 to both of the sides in the axial direction is restrained by flange rings 118 (i.e., two flange rings 118). In contrast, in the aspect of the disclosure, since the bearing restricts the movement of the planetary members in the axial direction. Thus, at least one of the flange rings becomes unnecessary. Therefore, the number of components can be reduced, and the width of the housing in the axial direction can be reduced.

The bearing may be a rolling bearing including an outer ring fixed to the housing, an inner ring fixed to the outer peripheral surface of the carrier member, and a plurality of rolling elements arranged to be rollable between the outer ring and the inner ring; and the inner ring may be a restricting member that restricts movement of the planetary members to a first axial side. The inner ring of the bearing, which supports the carrier member such that the carrier member is rotatable, rotates integrally with the carrier member and rotates at the same speed as a speed of the revolution of the planetary members along the inner peripheral surface of the ring member. Thus, since the inner ring is the restricting member for the planetary members, relative movement between the inner ring and the planetary members can be reduced as much as possible. Therefore, wear of these components can be restrained.

The housing may include a first fixing surface to which an outer peripheral surface of the ring member is fitted and fixed, and a second fixing surface to which an outer peripheral surface of the bearing is fitted and fixed; and the first fixing surface and the second fixing surface may have a same diameter and may be provided to be continuous with each other in an axial direction. With this configuration, it is possible to improve coaxiality of the ring member and the bearing, and it is possible to match an axis of the first shaft that is disposed radially inward of the ring member via the planetary members (i.e., an axis of the first shaft that is disposed radially inward of the ring member such that the planetary members are provided between the first shaft and the ring member), with an axis of the second shaft that is fixed to the carrier member, with a high degree of accuracy.

The planetary power transmission device according to the above aspect of the disclosure can be downsized and makes it possible to restrain the degradation of the rotation accuracy and the degradation of the rotation transmission performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A detailed description will hereinafter be provided on an embodiment of the disclosure with reference to the accompanying drawings. Note that the disclosure is not limited to the embodiment and various modifications can be made to the embodiment within the scope of the disclosure.

Figure 1:
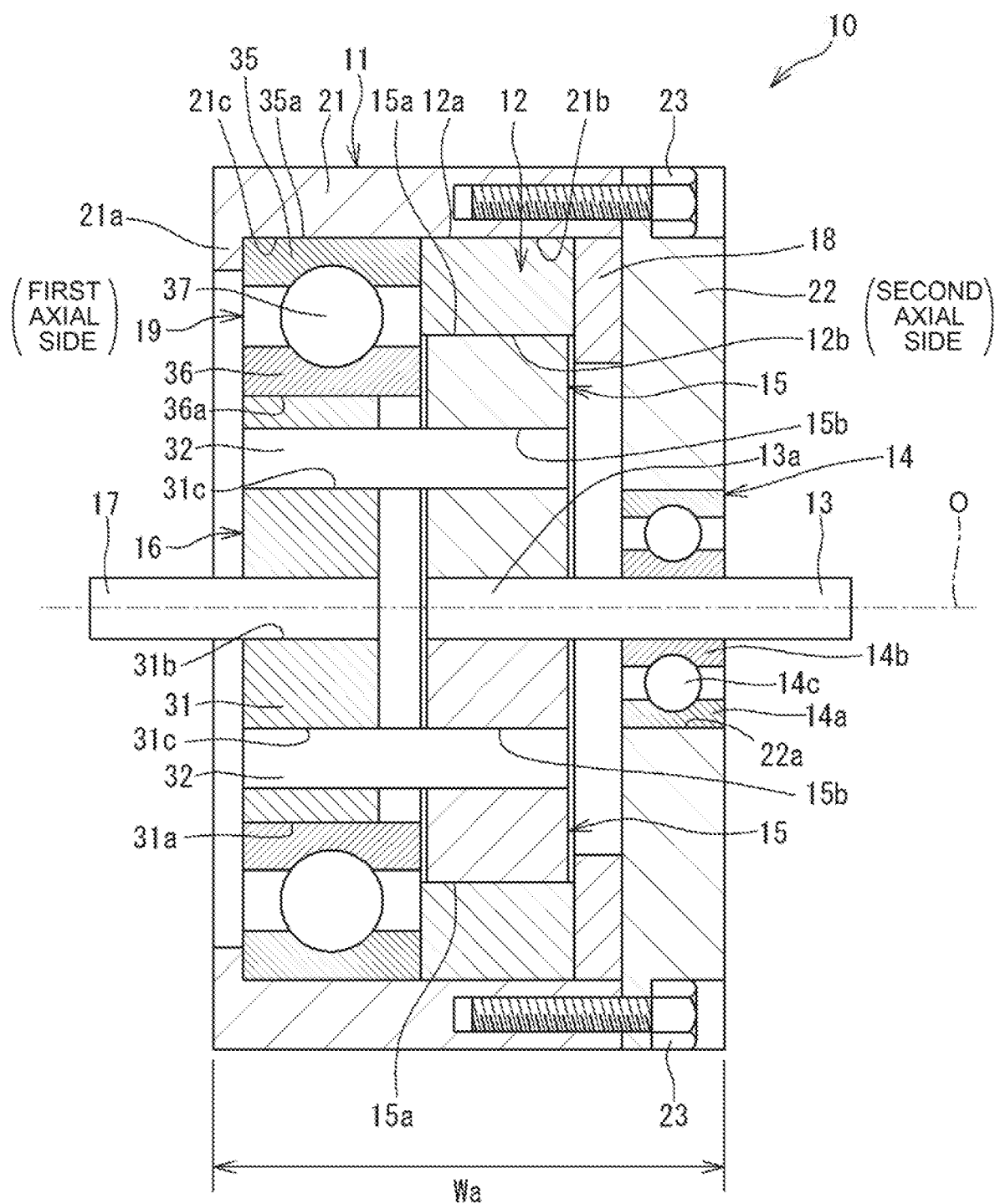
FIG. 1 is a sectional view of a planetary power transmission device according to an embodiment of the disclosure.

FIG. 1 is a lateral sectional view of a planetary power transmission device according to the embodiment of the disclosure. A planetary power transmission device (a planetary roller power transmission device) 10 according to this embodiment is a planetary roller power transmission device of a traction drive type, and includes a housing 11, a ring member 12, a first shaft 13 (a sun member 13a), a first rolling bearing 14, a plurality of planetary rollers (planetary members) 15, a carrier unit 16, a second shaft 17, a flange ring 18, and a second rolling bearing 19. In the present specification, one side in a direction along the first shaft 13 will be referred to as a "first axial side", and the other side will be referred to as a "second axial side".

The housing 11 is formed of an aluminum alloy or the like, and includes a housing body 21 and a lid body 22. The housing body 21 has a cylindrical shape. An elongated protrusion portion 21a that protrudes radially inward is formed at an end on the first axial side of the housing body 21. An inner peripheral surface of the housing body 21 has a constant inside diameter. In addition, the inner peripheral surface of the housing body 21 includes a first fixing surface 21b used to fix the ring member 12; and a second fixing surface 21c used to fix the second rolling bearing 19 as will be described later.

The lid body 22 has a disc shape and is disposed on the second axial side of the housing body 21. An outer peripheral portion of the lid body 22 is fixed to an end surface on the second axial side of the housing body 21 by bolts 23. A mounting hole 22a for mounting the first rolling bearing 14 (in other words, the mounting hole 22a in which the first rolling bearing 14 is mounted) is provided at a center of the lid body 22.

The ring member 12 is produced, for example, by subjecting a steel material, such as high carbon chromium bearing steel or carbon steel, to hardening treatment such as quenching and tempering. The ring member 12 is an annular body having a rectangular cross section. An outer peripheral surface 12a of the ring member 12 is fitted to the first fixing surface 21b as a part of the inner peripheral surface of the housing body 21 by press-fitting. In this way, the ring member 12 is fixed to the first fixing surface 21b.

The first shaft 13 is produced, for example, by subjecting the steel material, such as the high carbon chromium bearing steel or the carbon steel, to the hardening treatment such as quenching and tempering. The first shaft 13 has a columnar shape and is disposed concentrically with an axis 0 of the ring member 12. The first shaft 13 is inserted in the mounting hole 22a provided in the lid body 22, and is supported so as to be rotatable by the first rolling bearing 14 mounted in the mounting hole 22a.

The first rolling bearing 14 is a rolling bearing including an outer ring 14a that is fitted and fixed to an inner surface of the mounting hole 22a; an inner ring 14b that is fitted and fixed to an outer peripheral surface of the first shaft 13; and rolling elements 14c that are arranged so as to be rollable between the outer ring 14a and the inner ring 14b. For example, the first shaft 13 is coupled to an output shaft of a motor via a coupling or the like such that the first shaft 13 is rotatable integrally with the output shaft of the motor. The first shaft 13 serves as an input shaft that receives rotary power from the motor.

Figure 2:
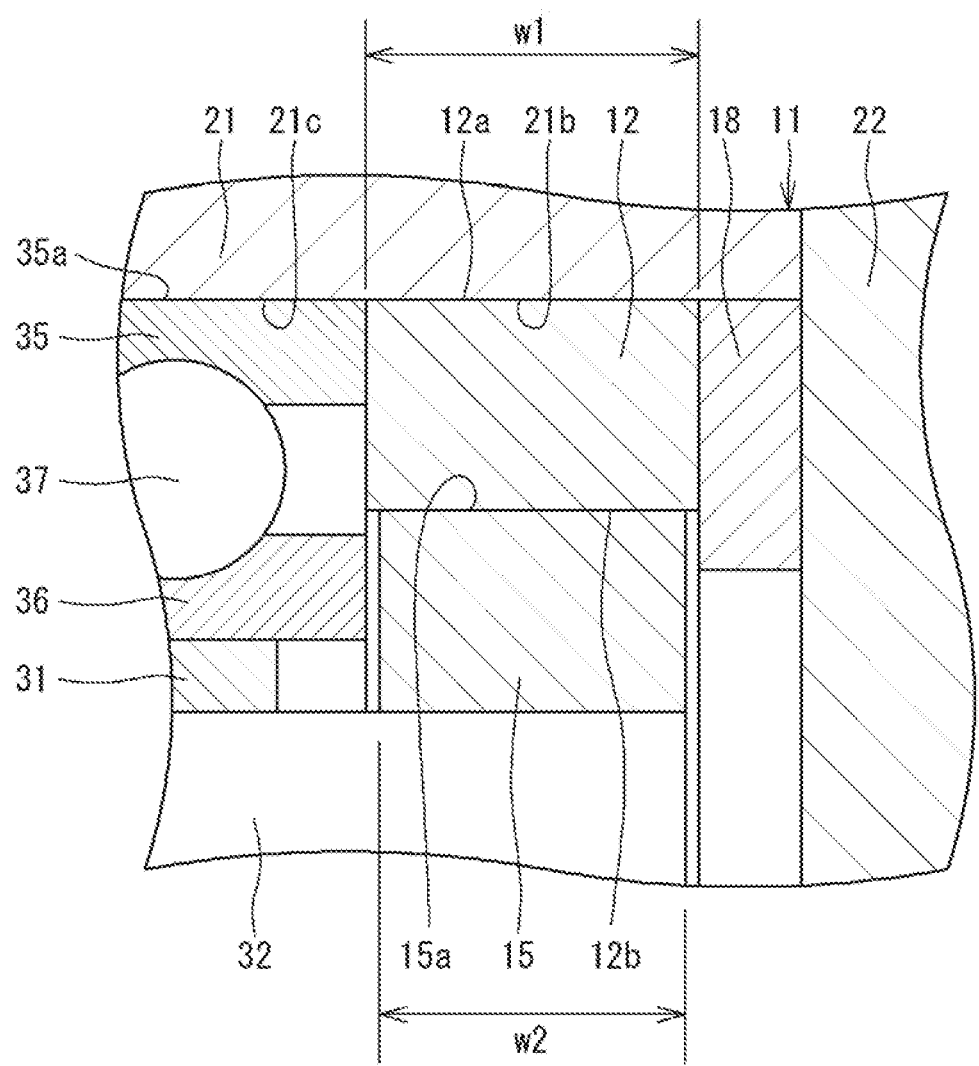
FIG. 2 is an enlarged sectional view of a main portion of FIG. 1.

Each of the planetary rollers 15 is produced, for example, by subjecting the steel material, such as the high carbon chromium bearing steel or the carbon steel, to the hardening treatment such as quenching and tempering. Each of the planetary rollers 15 has a cylindrical shape and is disposed between the ring member 12 and the first shaft 13. In this embodiment, for example, the three or four planetary rollers 15 are arranged at equally-spaced intervals in a circumferential direction. Each of the planetary rollers 15 has an outer peripheral surface 15a and an inner peripheral surface 15b that are mutually concentric cylindrical surfaces. As shown in FIG. 2, a width w2 of each of the planetary rollers 15 in the axial direction is slightly less than a width w1 of the ring member 12 in the axial direction.

Each of the planetary rollers 15 is in rolling contact with the outer peripheral surface of the first shaft 13 and an inner peripheral surface 12b of the ring member 12. In addition, a diameter of each of the planetary rollers 15 is slightly greater than a radial dimension (radial length) between an inner periphery of the ring member 12 and an outer periphery of the first shaft 13. Accordingly, each of the planetary rollers 15 contacts the ring member 12 and the first shaft 13 while applying a specified contact pressure thereto. In other words, the planetary rollers 15 and the first shaft 13 are provided inside the inner periphery of the ring member 12 with a negative clearance. The traction oil is applied to contact surfaces between the planetary rollers 15 and each of the ring member 12 and the first shaft 13. When the first shaft 13 rotates, the rotary power is transmitted to the planetary rollers 15 due to the shearing force of the traction oil, and the planetary rollers 15 revolve on the inner peripheral surface 12b of the ring member 12.

In this embodiment, a portion of the first shaft 13, which contacts the plurality of planetary rollers 15, is set as the sun member 13a. That is, the first shall 13 in this embodiment also functions as the sun member 13a. In addition, the first shaft 13 is formed integrally with the sun member 13a and thus is fixed to the sun member 13a. However, the first shaft 13 and the sun member 13a may be formed separately. In such a case, the first shaft 13 is coupled to the sun member 13a and thus is fixed to the sun member 13a.

The carrier unit 16 includes a carrier plate (a carrier member) 31 and support shafts 32. The carrier plate 31 is formed of aluminum alloy steel or the like to have a disc shape and is disposed on the first axial side of the planetary rollers 15. A plurality of fixing holes 31c, which corresponds to the plurality of the planetary rollers 15, is formed in an outer peripheral portion of the carrier plate 31, and the support shafts 32 are respectively fitted and fixed to the fixing holes 31c by press-fitting. A center hole 31b is provided at a center of the carrier plate 31.

Each of the support shafts 32 is produced, for example, by subjecting the steel material, such as the high carbon chromium bearing steel or the carbon steel, to the hardening treatment such as quenching and tempering. Each of the support shafts 32 has a columnar shape, is inserted in the inner peripheral surface 15b of the planetary roller 15, and slidingly contacts the inner peripheral surface 15b. Thus, a slight clearance that allows slipping (sliding) between the support shaft 32 and the inner peripheral surface 15b is formed therebetween. Therefore, each of the planetary rollers 15 can move in the axial direction on the corresponding support shaft 32.

The second shaft 17 is formed to have a columnar shape with the use of stainless steel or the like. The second shaft 17 is fitted and fixed to the center hole 31b of the carrier plate 31 so as to be concentric with the first shaft 13. The second shaft 17 and each of the support shafts 32 are parallel with each other. The second shaft 17 protrudes from the carrier plate 31 to the first axial side while each of the support shafts 32 protrudes from the carrier plate 31 to the second axial side. The second shaft 17 serves as an output shaft of the planetary roller power transmission device 10, and outputs the rotary power, which is received by the first shaft 13, to the outside after the speed of the rotation is reduced.

The flange ring 18 is formed of metal such as tool steel, and has a ring shape. The flange ring 18 is disposed adjacent to a second axial side-portion of the ring member 12 and is held between the ring member 12 and the lid body 22. An outside diameter of the flange ring 18 is equal to or slightly less than an inside diameter of the housing body 21. An inside diameter of the flange ring 18 is less than an inside diameter of the ring member 12, and the flange ring 18 protrudes radially inward from the inner peripheral surface 12b of the ring member 12. As described above, each of the planetary rollers 15, which rolls on the inner peripheral surface 12h of the ring member 12, can move in the axial direction on the corresponding support shaft 32. However, the movement of each of the planetary rollers 15 to the second axial side is restricted by the flange ring 18.

The second rolling bearing 19 is mounted in the housing 11 and supports the carrier unit 16 such that the carrier unit 16 is rotatable. In other words, the carrier unit 16 is supported so as to be rotatable by the housing 11 via the second rolling bearing 19. The second rolling bearing 19 includes an outer ring 35, an inner ring 36, and a plurality of rolling elements 37 arranged between the inner ring 36 and the outer ring 35.

An outer peripheral surface 35a of the outer ring 35 is fitted and fixed to the second fixing surface 21c that is formed in the inner peripheral surface of the housing body 21, by press-fitting. An outside diameter (a nominal dimension) of the outer ring 35 is equal to an outside diameter (a nominal dimension) of the ring member 12. An end surface on the first axial side of the outer ring 35 contacts the elongated protrusion portion 21a, and movement of the outer ring 35 to the first axial side is thus restricted. In addition, the ring member 12 is disposed adjacent to a second axial side-portion of the outer ring 35. An end surface on the second axial side of the outer ring 35 faces and contacts an end surface on the first axial side of the ring member 12.

An outer peripheral surface 31a of the carrier plate 31 is fitted and fixed to an inner peripheral surface 36a of the inner ring 36 by press fitting. The inner ring 36 has the same width in the axial direction as that of the outer ring 35. Each of the rolling elements 37 is disposed between a raceway provided on an inner peripheral surface of the outer ring 35 and a raceway provided on an outer peripheral surface of the inner ring 36. Each of the rolling elements 37 in this embodiment is a ball.

FIG. 2 is an enlarged sectional view of a main portion of FIG. 1. The inner ring 36 of the second rolling bearing 19 has an outside diameter smaller than the inside diameter of the ring member 12. Thus, the inner ring 36 and the ring member 12 do not contact each other. In addition, the inner ring 36 is disposed adjacent to a first axial side-portion of each of the planetary rollers 15. As described above, each of the planetary rollers 15, which rolls on the inner peripheral surface 12b of the ring member 12, can move in the axial direction on the corresponding support shaft 32. However, the movement of each of the planetary rollers 15 to the first axial side is restricted by the inner ring 36. That is, the movement of each of the planetary rollers 15 to both of the sides in the axial direction is restricted by the flange ring 18 and the inner ring 36 (in other words, the movement of each of the planetary rollers 15 to each of the sides in the axial direction is restricted by the flange ring 18 or the inner ring 36). Since the movement of each of the planetary rollers 15 to both of the sides in the axial direction is thus restricted, skewing of the planetary rollers 15 is prevented, and degradation of performance of power transmission by the planetary rollers 15 is thus prevented.

Figure 3:
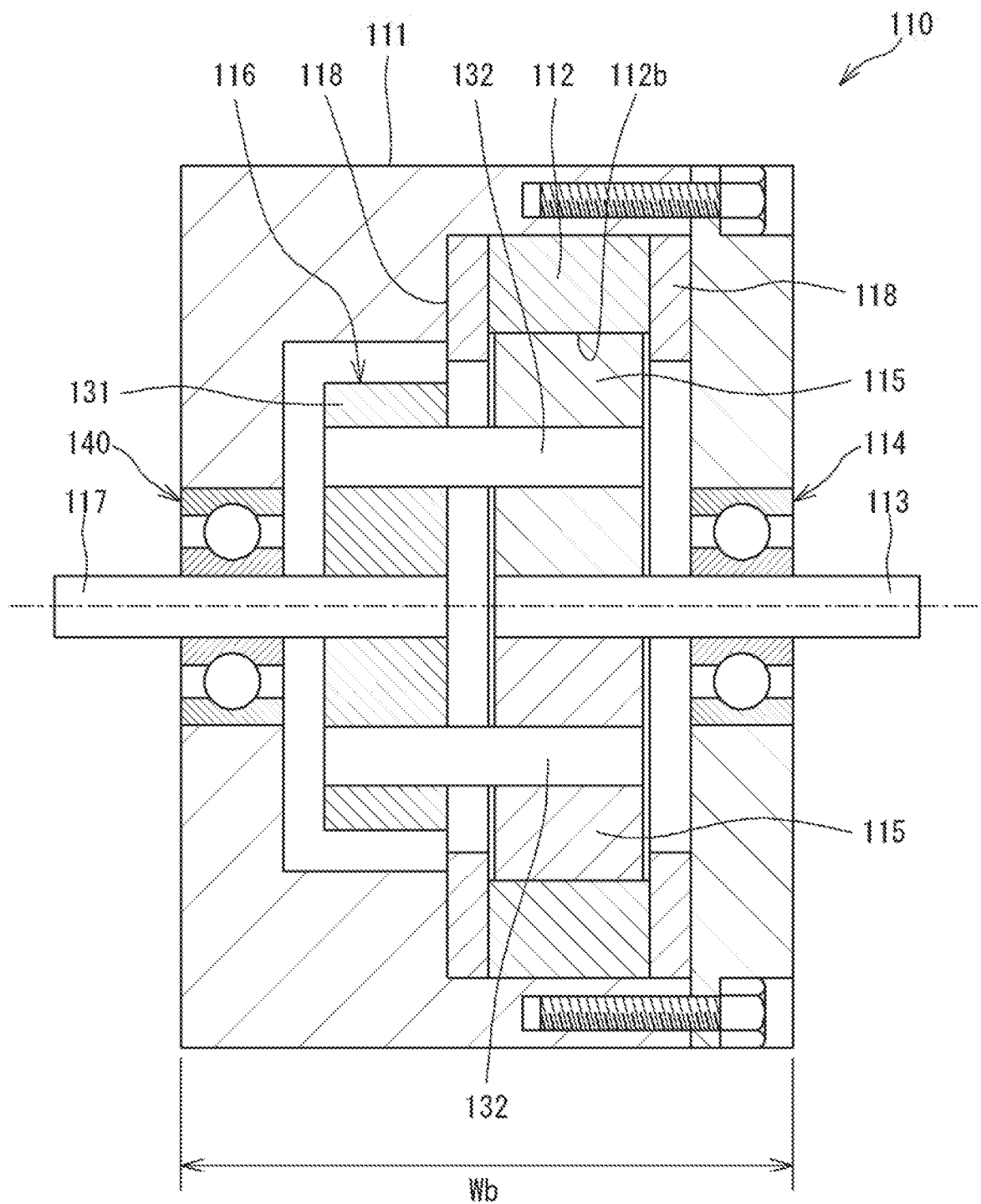
FIG. 3 is a sectional view of a planetary power transmission device according to related art.

In the planetary roller power transmission device 10 according to this embodiment that has been described so far, the outer peripheral surface 31a of the carrier plate 31 in the carrier unit 16 is rotatably supported by the housing 11 via the second rolling bearing 19. Meanwhile, in the planetary roller power transmission device 110 in the related art, as shown in FIG. 3, the second shaft 117, which is coupled to the carrier plate 131, is supported by the housing 111 via the rolling bearing 140. In the planetary roller power transmission device 110 in the related art, since the rolling bearing 140, which supports the second shaft 117, is disposed on the side of a first axial side-portion of the carrier plate 131, a width Wb of the housing 111 in the axial direction is increased. In contrast, in this embodiment, the carrier plate 31 itself is supported by the housing 11 via the second rolling bearing 19 disposed on the outer peripheral surface of the carrier plate 31. Thus, as compared to the planetary roller power transmission device 110 in the related art, a width Wa of the housing 11 in the axial direction can be reduced. Therefore, the size of the planetary roller power transmission device 10 can be reduced.

The slight clearance is provided between the inner peripheral surface 15b of each of the planetary rollers 15 and the outer peripheral surface of the corresponding support shaft 32. Due to the clearance, the entire carrier unit 16 including the support shafts 32 may be tilted with respect to the planetary rollers 15. In the planetary roller power transmission device 110 in the related art shown in FIG. 3, there is a possibility that the carrier unit 116 may be significantly tilted with the rolling bearing 140 serving as the fulcrum, and thus, the coaxiality of the first shaft 113 and the second shaft 117 may be decreased. In contrast, in this embodiment, the tilting of the carrier unit 16 is restrained by the second rolling bearing 19. Thus, the coaxiality of the first shaft 13 and the second shaft 17 is maintained. Therefore, it is possible to restrain degradation of rotation accuracy and degradation of the power transmission performance.

Since the inner ring 36 of the second rolling bearing 19 functions as a restricting member that restricts the movement of each of the planetary rollers 15 to the first axial side, it is not necessary to respectively provide the flange rings 18 on both of the sides of the planetary rollers 15 in the axial direction (in other words, it is not necessary to provide the two flange rings 18). Therefore, the number of the components can be reduced, and the width Wa of the housing 11 in the axial direction can be further reduced.

Furthermore, since the inner ring 36 of the second rolling bearing 19 rotates together with the carrier unit 16 (the carrier plate 31) about the axis 0, relative movement between the inner ring 36 and the planetary rollers 15, which also revolve together with the carrier unit 16, is caused only by rotation of the planetary rollers 15 about their own axes. Thus, it is possible to reduce a sliding amount between the inner ring 36 and the planetary rollers 15. As a result, it is possible to restrain wear of the inner ring 36 and the planetary rollers 15.

The housing body 21 of the housing 11 according to this embodiment includes the first fixing surface 21b used to fix the ring member 12 (i.e., the first fixing surface 21b to which the ring member 12 is fixed); and the second fixing surface 21c used to fix the carrier plate 31 (i.e., the second fixing surface 21c to which the carrier plate 31 is fixed). The first fixing surface 21b and the second fixing surface 21c have the same diameter and are provided to be continuous with each other in the axial direction. Thus, the first fixing surface 21b and the second fixing surface 21c can be easily processed. In addition, since it is possible to improve the coaxiality of the ring member 12 and the carrier plate 31, which are respectively fixed to the first fixing surface 21b and the second fixing surface 21c, it is also possible to improve the coaxiality of the first shaft 13 that is disposed radially inward of the ring member 12 via the planetary rollers 15 (i.e., the first shaft 13 that is disposed radially inward of the ring member 12 such that the planetary rollers 15 are disposed between the first shaft 13 and the ring member 12), and the second shaft 17 that is mounted at the center of the carrier plate 31.

The disclosure is not limited to the above-described embodiment, and various modifications can be made thereto within the scope of the disclosure. For example, the planetary roller is used as the planetary member in the above-described embodiment. However, a planetary gear may be used as the planetary member. In this case, gears that mesh with the planetary gear are respectively provided on the inner peripheral surface of the ring member and the outer peripheral surface of the first shaft.

A bearing such as a slide bearing or a needle roller bearing that allows the movement of the planetary roller in the axial direction may be provided between the inner peripheral surface of the planetary roller and the support shaft of the carrier unit. The carrier plate and the support shaft of the carrier unit may be integrally formed. In addition, the carrier plate and the second shaft may be also integrally formed. The bearing that supports the outer peripheral surface of the carrier plate is not limited to the rolling bearing and may be a slide bearing.

In the planetary power transmission device according to the above embodiment, the first shaft is set as the input shaft, and the second shaft is set as the output shaft. However, the disclosure is not limited to this configuration. The second shaft may be set as the input shaft, and the first shaft may be set as the output shaft. In the planetary power transmission device according to the above embodiment, among the ring member, the planetary member, the carrier member, the sun member, the first shaft, and the second shaft, the ring member is fixed. The first shaft is set as the input shaft, and the second shaft is set as the output shaft. After the rotary power is received by the first shaft, the speed of the rotation is reduced, and the rotary power is output from the second shaft. However, the disclosure is not limited to this configuration. For example, instead of the ring member, the carrier member or the sun member may be fixed.

What is claimed is:
1. A planetary power transmission device comprising:
a ring member;
a sun member disposed concentrically with an axis of the ring member at a position radially inward of the ring member;
a first shaft disposed concentrically with the sun member and fixed to the sun member;
a plurality of planetary members provided between the ring member and the sun member;
support shafts configured to respectively support the planetary members such that the planetary members are rotatable;
a carrier member to which the support shafts are fixed, the carrier member being configured to rotate in accordance with revolution of the planetary members along an inner peripheral surface of the ring member;
a second shaft fixed to the carrier member so as to be concentric with the first shaft; and
a housing configured to accommodate the ring member, the sun member, the planetary members, and the carrier member, wherein
an outer peripheral surface of the carrier member is rotatably supported by the housing via bearing, wherein:
the bearing serves as a restricting member that restricts movement of the planetary members to a first axial side, the bearing is a rolling bearing including an outer ring fixed to the housing, an inner ring fixed to the outer peripheral surface of the carrier member, and a plurality of rolling elements arranged to be rollable between the outer ring and the inner ring, the inner ring is the restricting member that restricts movement of the planetary members to the first axial side, the inner ring has an outside diameter smaller than an inside diameter of the ring member, and a clearance between the inner ring and each of the planetary members is smaller than a clearance between the carrier member and each of the planetary members.

2. The planetary power transmission device according to claim 1, wherein:

the housing includes a first fixing surface to which an outer peripheral surface of the ring member is fitted and fixed, and a second fixing surface to which an outer peripheral surface of the bearing is fitted and fixed; and the first fixing surface and the second fixing surface have a same diameter and are provided to be continuous with each other in an axial direction.

* * * * *